(12) United States Patent
Le et al.

(10) Patent No.: US 8,239,919 B2
(45) Date of Patent: Aug. 7, 2012

(54) FLEXIBLE HARDWARE PASSWORD PROTECTION AND ACCESS CONTROL

(75) Inventors: Mike Le, Huntington Beach, CA (US); Keith R. Jones, Laguna Niguel, CA (US); Gilberto I. Sada, Irvine, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1279 days.

(21) Appl. No.: 11/483,252

(22) Filed: Jul. 6, 2006

(65) Prior Publication Data

US 2008/0022363 A1    Jan. 24, 2008

(51) Int. Cl.
G06F 17/30    (2006.01)

(52) U.S. Cl. .......... 726/2; 726/5; 713/182; 713/189; 713/193; 711/141; 711/144; 711/151; 711/158; 710/106

(58) Field of Classification Search ............ 713/183, 713/189, 193, 182; 726/5, 16, 36, 2; 705/60; 709/222; 707/9; 711/114, 143, 141, 144, 711/151, 158; 398/135, 137; 710/106
See application file for complete search history.

(56) References Cited

U.S. PATENT DOCUMENTS

| | | | |
|---|---|---|---|
| 5,742,683 A * | 4/1998 | Lee et al. ............... | 705/60 |
| 5,956,168 A | 9/1999 | Levinson et al. | |
| 6,317,836 B1 * | 11/2001 | Goren et al. ............ | 726/36 |
| 6,643,777 B1 * | 11/2003 | Chu ........................ | 726/16 |
| 6,661,940 B2 | 12/2003 | Kim | |
| 6,668,323 B1 * | 12/2003 | Challener et al. ....... | 713/183 |
| 6,707,600 B1 | 3/2004 | Dijaili et al. | |
| 6,740,864 B1 | 5/2004 | Dries | |
| 6,801,555 B1 | 10/2004 | DiJaili et al. | |
| 6,837,625 B2 | 1/2005 | Schott et al. | |
| 6,852,966 B1 | 2/2005 | Douma et al. | |
| 6,868,104 B2 | 3/2005 | Stewart et al. | |
| 6,888,123 B2 | 5/2005 | Douma et al. | |
| 6,912,361 B2 * | 6/2005 | Aronson et al. ......... | 398/135 |
| 6,918,044 B1 * | 7/2005 | Robins et al. ........... | 726/5 |
| 6,941,077 B2 | 9/2005 | Aronson et al. | |
| 6,956,643 B2 | 10/2005 | Farr et al. | |
| 6,957,021 B2 | 10/2005 | Aronson et al. | |
| 6,967,320 B2 | 11/2005 | Chieng et al. | |
| 7,031,574 B2 | 4/2006 | Huang et al. | |
| 7,039,082 B2 | 5/2006 | Stewart et al. | |
| 7,050,720 B2 | 5/2006 | Aronson et al. | |
| 7,066,746 B1 | 6/2006 | Togami et al. | |
| 7,079,775 B2 | 7/2006 | Aronson et al. | |
| 7,152,693 B2 * | 12/2006 | Man et al. ............... | 173/183 |
| 7,174,437 B2 * | 2/2007 | Kaczynski ............... | 711/158 |
| 2006/0112246 A1 * | 5/2006 | Boning .................... | 711/163 |

* cited by examiner

*Primary Examiner* — Thanhnga B Truong
(74) *Attorney, Agent, or Firm* — Weide & Miller, Ltd.

(57) ABSTRACT

An optic module is disclosed having a memory configured to store data. To selectively control access to the memory and data stored in memory, a method and apparatus for memory access control is provided which creates access levels. The access levels include associated passwords, and read/write capability control, and address access range. During use a technician or other party would enter a password via an interface and the entered password is compared to the password associated with each access level. If a match is not found, then access to the memory, a hence data within the memory is denied. If a match is found the technician gains access to the data stored in the memory address range associated with the access level. Read and write access may also be granted or denied.

18 Claims, 6 Drawing Sheets

FLEXIBLE HARDWARE PASSWORD PROTECTION AND ACCESS CONTROL

FIELD OF THE INVENTION

The invention relates to optic modules, and in particular, to a memory access control in an optic module.

RELATED ART

Optic modules are utilized to perform communication over optic channels. These modules are often expensive and relied upon for important data communication. In other situations or in the future, optic modules may be utilized in consumer applications to increase bandwidth. In all environments, module failure is undesirable and as such, optic modules are often configured with monitoring or diagnostic capability. Such monitoring of one or more of the module outputs, inputs or other factors, such an environment, can predict or detect failure.

To facilitate monitoring, the modules may be equipped with one or more monitoring elements and memory or other data storage elements. The modules may store system data, environment data, and threshold values. A processor and user interface maybe provided so that a user may access the data values stored in the memory of the module. An external host may connect to the module to allow for user interface with the module, such as to input or extract data from the module.

As is commonly understood, multiple optic modules may be configured within a single enclosure or unit to service multiple optic fibers. This reduces space consumption, and allows for use of shared resources, such as power supplies and rack slots.

Although multiple optic modules may be located within a single enclosure or unit, one drawback to prior art system is that each optic module, if configured in accordance with the standard governing optic modules has the same address and share a common memory. The current standard governing optic modules comprises SFF-8472. Stated another way, for the optic module to be standard compliant, which is often a required characteristic, it must be addressed in the exact manner specified in the standard. When multiple optic modules are located within a single enclosure or module, this limitation may undesirably hinder efficient communication between a host and with the modules.

One additional disadvantage of prior art modules is that the memory locations for an entire module may be access through use of a single password. As such, it is not possible to limit or selectively control access to the numerous different memory locations in the module. This is a drawback because it may be desired to restrict access to certain memory locations for certain individuals, while allowing greater access to other individuals or entities. Moreover, it may be desired to grant certain individuals access to certain locations, while granting other individuals access to entirely different locations.

The present invention overcomes these drawbacks in the prior art and provides additional benefits.

SUMMARY

To overcome the drawbacks of the prior art, a method and apparatus for controlling access to data stored in a memory of an optic module is disclosed. In one embodiment of this method for controlling access to data stored in a first memory in an optic module is first provided. Then, responsive to providing a password entry to a memory controller, the system reads one or more access level passwords from the first memory or a second memory. This exemplary method of operation then compares the password entry to the one or more access level passwords and, responsive to the comparing not locating a match between the password entry and an access level password, the system denies access to the data stored in the first memory. Alternatively, responsive to the comparing locating a match between the password entry and an access level password, the system grants access to the data stored at the memory addresses defined in an address access range associated with the matched access level password.

In one embodiment, the method further comprises storing a second access level password in the first memory, the second memory, or both. In addition, the address access range defines to which memory locations access is granted. The address access range may define consecutive or non-consecutive memory locations. This method may further comprise analyzing a write memory field to determine if write capability is granted to the data stored at the memory access range.

Also disclosed herein is a memory access control system for controlling access to data in memory in an optic module. In one embodiment this system comprises a user interface configured to receive an entered password from a user and one or more memory units configured to stored optic module data and one or more access level data fields. It is contemplated that at least one of the one or more access level data fields is configured to store at least one access level password and an associated address range. Furthermore, a comparator is provided as part of this system and configured to compare the entered password to at least one of the at least one access level passwords. A controller, responsive to the comparison yielding a match between the entered password and at least one access level password associated with an access level, is configured to grant access to the data stored in the address range associated with the matching access level.

In one variation, the comparator comprises a controller or processor. In addition, the address range may comprise a range of address which includes non-consecutive addresses. The access level data field may store a write capability field configured to store data that controls write capability for a password. There may be multiple memories and hence in one embodiment at least one access level password is stored in a first memory and the optic module data is stored in a second memory. Furthermore, in one configuration at least one of the one or more access level data fields further comprises a first password and an associated first address range and a second password and an associated second address range.

In another embodiment, a multi-level memory access control system for controlling access to data in memory in an optic module is disclosed. In this embodiment the system comprises a user interface configured to receive at least a first entered password and second entered password from one or more users. The system also comprises a one or more memory units configured to store optic module data. The memory also stores one or more access level data fields such that at least one of the access level data fields is configured to store at least a first stored password and a second stored password. An address group is associated with the first stored password and an address group may be associated with the second stored password. Furthermore, a controller is part of the system and is configured to compare the first entered password to the stored first password. Responsive to a match between the first entered password and the first stored password, the controller is further configured to grant access to the address group associated with the first stored password and then accept a second entered password. The controller then compares the second entered password to the second stored password and responsive to a match between the second entered password and the second stored password, grants access to the address group associated with the second stored password.

In this system the address group associated with the first password may comprise fewer memory addresses than the combination of the address group associated with the first stored password and the address group associated with the second stored password. Furthermore, access to the address range associated with the second stored password may include the address groups associated with the first stored password. As set forth below in more detail, this system may further comprise a write field as part of the one or more access level data fields, wherein data in the write field controls memory write capability. It is contemplated that the controller may comprise a processor configured to execute machine readable code. Also part of this system may be a host configured to receive the first entered password from a user and communicate with more than one optic module via a shared bus.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. The features and elements disclosed herein may be enabled or claimed individually or in any combination.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
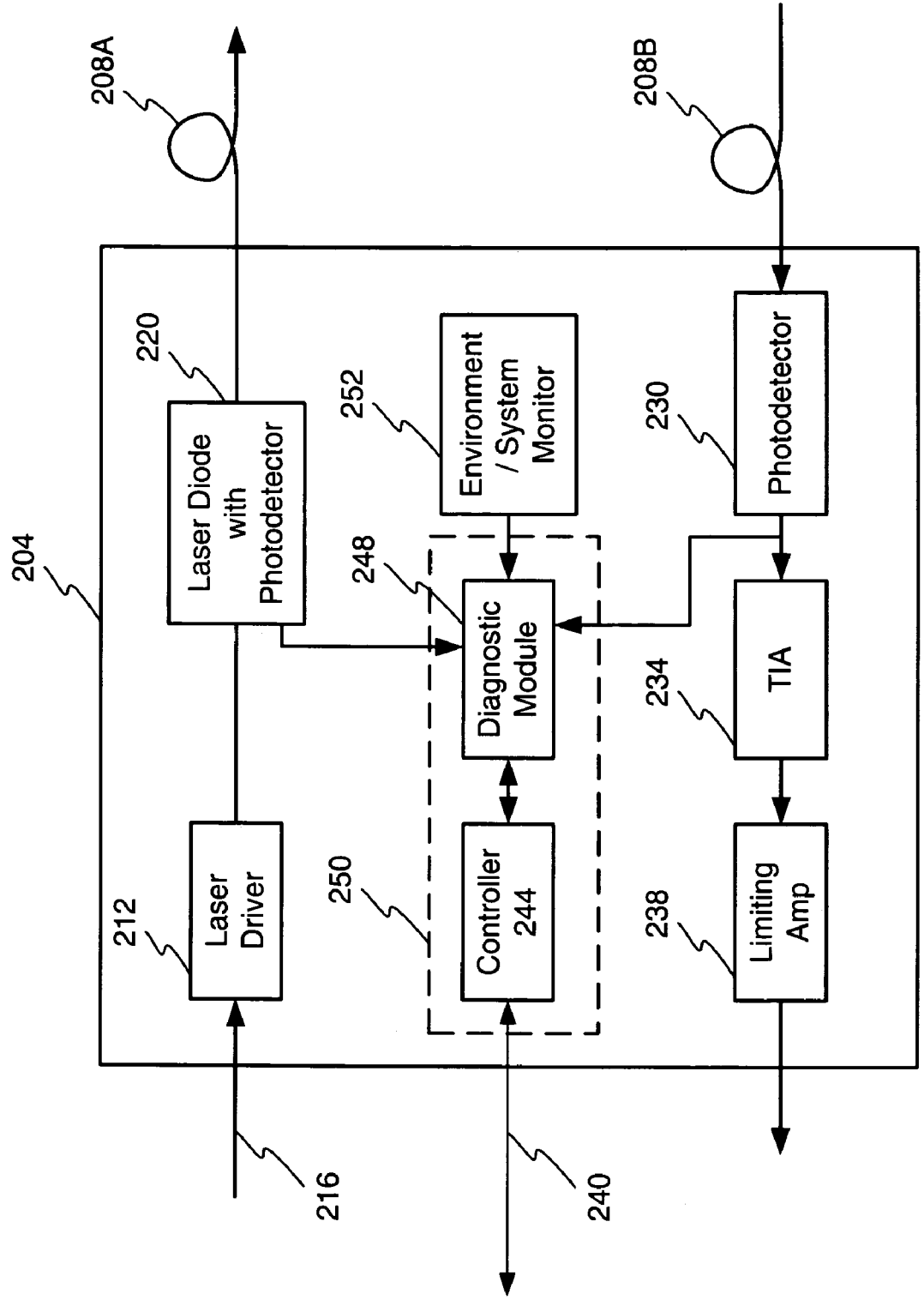
FIG. 1 illustrates a block diagram of an example environment of use.

FIG. 1 illustrates a block diagram of an example environment of use for the method and apparatus disclosed herein. This example embodiment comprises an optic module 204 as may be configured to communicate over optic fiber 208A, 208B. In general, the module 204 may be considered for purposes of discussion as a transmitter, shown at the top of the figure within the module 204, and a receiver, shown at the bottom of the module. A control and monitoring system 250, 252 is shown generally between the transmitter and receiver and may be considered as shared between the transmitter and receiver portion of the module 204. Although not shown, additional processing, gating, buffering, or other elements may be associated with the module 204.

In this example embodiment the transmitter comprises a laser driver 212 configured to receive one or more incoming signals on one or more data inputs 216. The laser driver 212 converts an incoming voltage level, representing an outgoing data signal, to an electrical current suitable for driving an optic signal generating device, such as laser diode 220. The laser driver 212 may map the incoming data signal into an electrical current having parameters, namely bias current and modulation current to facilitate driving any optic generator, such as diode 220.

It is contemplated that the optic signal generator 220 may include a photo detector capable of generating an output that represents one or more aspects of the optic signal generator or the optic signal, such as power level or other factor. One or more fibers 208A connect to the module 204 to receive the outgoing signal from the signal generator 220. Any type fiber 208 or other transmitter apparatus may be utilized.

Turning now to the receiver aspects of the module 204, one or more fiber 208B carrying incoming optic signals connect to a photo detector 230. The photo detector 230 converts the incoming optic signals to electrical signals, which are thereafter provided to a transimpedance amplifier 234 (TIA), which is capable of converting the low magnitude current signal from the detector 230 into a voltage value output signal. The output of the TIA 234 is forwarded to a limiting amplifier 238 which may serve as the final stage to set the signal level appropriate for additional processing. The output of the limiting amplifier 238 is output from the module 204 as an electrical signal at a desired voltage level.

The output from the photo detector 230, 220 may connect or be monitored by a diagnostic module 248 associated with the controller aspects of the module 204. This is discussed below in more detail.

Assisting with or monitoring one or more aspects of the module 204 are a controller and monitoring aspects 250, 252 of the module 204. In this embodiment a host (not shown) may communicate over a two wire interface path 240 with a controller 244. The controller 244 may comprise a processor, control logic, or any other element or device capable of performing as described herein. The controller 244 communicates with a diagnostic module 248, which may be configured into a single integrated circuit or ASIC. The diagnostic module 248, in connection with the controller 244, may monitor and/or control one or more aspects of the module.

It is contemplated that the controller 244 and diagnostic module 248 may also be configured to control or dictate one or more modes or aspects of module operation. In one embodiment the module may conform with general application or specification SFF-8472, which comprises a multivendor agreement for providing digital diagnostic and monitoring of the optic module. SFF8472 is hereby incorporated by reference. The SFF8472 specifies an electrical interface, such as interface 240, as a two wire serial interface.

Memory may be associated with the controller 244 and/or diagnostic module 248 to store threshold information and/or current or past data regarding the module, module operation or module environment. The locations within the memory may be identified by an address and the module itself may be identified with an address. Access to the memory occurs as described below. Controlled access to the memory is achieved through the process and system described below.

One or more environment or system monitors 252 may communicate with the module 248 or controller 244 to provide information regarding the module, module environment or device behavior or operation. One example of such a monitoring device may be a temperature monitor.

Figure 2:
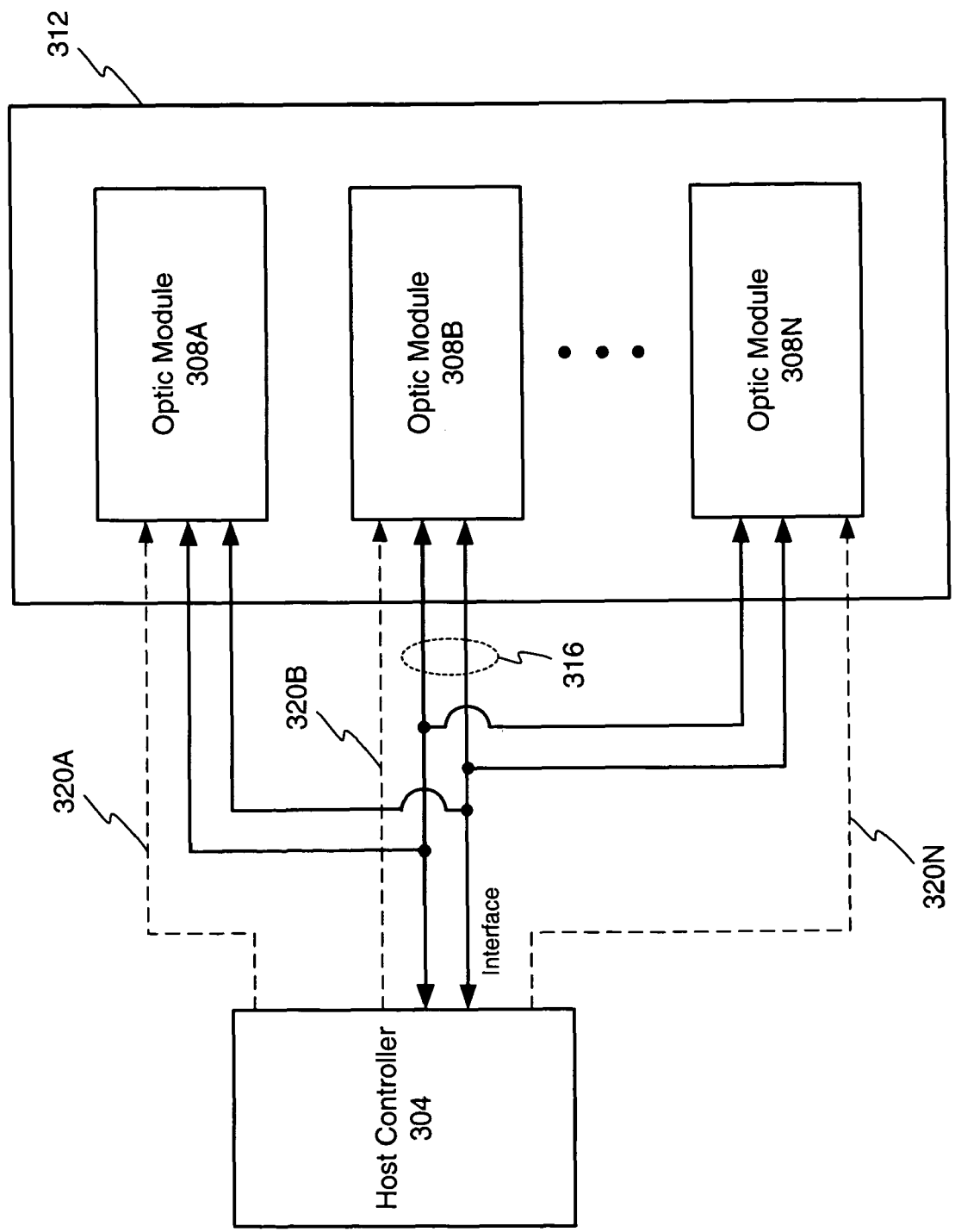
FIG. 2 illustrates an example embodiment of multiple optic modules controlled by a single host device.

FIG. 2 illustrates a block diagram of an example embodiment of multiple optic modules controlled by a single host device. By implementing the method and apparatus as described herein, a single host controller may communicate with multiple modules and via the host controller and the module, selective access to the memory of each module may be achieved.

As shown, a host 304 may comprise any devices capable of communicating with one or more optic modules 308A, 308B, 308N. The value of N may comprise any whole number. In one embodiment the controller 304 comprises a computer. The multiple modules 308 may be contained within a single housing 312 or within a single rack storage unit.

Connecting the host 304 to the modules 308 is a shared interface path or line 316. In this example embodiment the interface path comprise a two wire interface path, but in other embodiments other types of interfaces may be utilized. In this embodiment the interface 316 is a shared interface, thereby eliminating the need, when combined with a unique addressing scheme, for a separate host for each module. Also provided is a transmit disable line 320A, 320B, . . . 320N from the host 304 to each module 308A. In the embodiment described herein the transmit disable line 320 comprises a direct path or connection into each module (or integrated circuit within the module) that may be utilized to send a signal from the host to the module to disable operation of the module. This may be useful, during operation, to disable the signal generator during repair, reset, testing, or for any other reason. It is contemplated that the transmit disable signal may set a flag or bit in a register or in any other manner force the module to disable the signal generator or other element or aspect of operation.

In the embodiment of FIG. 2, the host 304 is configured to communicate with each module using a unique address assigned to an optic module 308. In one embodiment the optic modules are each assigned a unique address during manufacture, configuration, and are thus equipped, when installed, with a unique address. For example, the module may be configured with a different image stored in a memory, such as EEPROM. Then at start-up, the image is loaded from the memory to modify one or more addresses of data within the module, the module address, or both. While this may or may not be considered standard compliant, it overcomes the drawbacks of the prior art. When the host 304 intends to communicate with a particular module 308, it utilizes the modules address in the communication. Although all modules 308 may receive the message, only the module with the corresponding address will accept or act on the message. In one embodiment the module(s) appear as memory to the host, which may be accessed, written to, or interrogated. One type of data which may be stored on the module comprises device identification data. Examples of the type of device identification data that may be found in the module includes, but is not limited to, vendor ID, Part ID, Optic Link information, data rate, and wavelength. In addition, diagnostic information may also be found in the module, including, but not limited to supply voltage monitor values, temperature monitor values, transmit and receive optic power monitor values, modulation current values, and status flags. In one embodiment the address for the serial ID information is at address A0X and the diagnostic information is at A2X. The data may also include data that controls operation of the module.

In standard compliant modules, all modules have the same addresses, which inhibit communication with only a particular module via path 316. Thus standard compliant devices all have or are equipped with the same address, which prevents use of a shared bus. As a result, in one embodiment, the optic module may be configured to selectively enable a module or module interface 316 based on another control signal from the host to the module. In one embodiment, the control signal that may temporarily disable a module's interface path 316 comprises a signal sent via the transmit disable line 320. When the interfaces for all but one module 308 are disabled, the module with an active interface may receive a communication from the host that re-writes the module's address to a unique address. The process may sequentially occur with the other modules 308 until all of the modules 308 within the enclosure are assigned unique addresses. Thereafter, each module 308 may be accessed or communicated with via the shared interface path 316 by a single host. This operation is discussed below in more detail.

Figure 3:
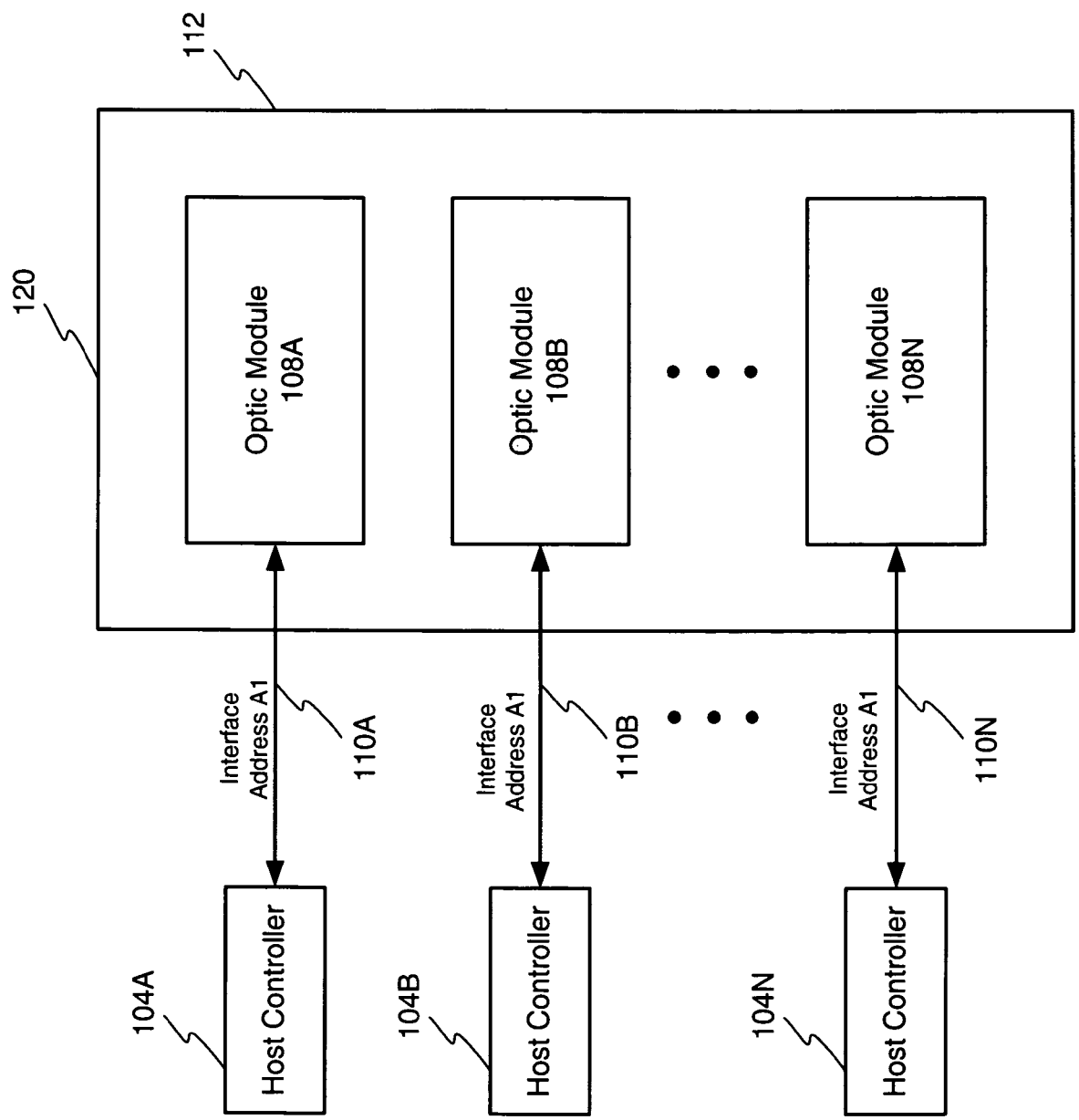
FIG. 3 illustrates a block diagram of a prior art host to optic module communication arrangement.

FIG. 3 illustrates an embodiment that also provides for access from a host to an optic module. In this embodiment, a host controller 104A, 104B, . . . 104N is associated with each optic module 108A, 108B, . . . 108N, where N may represent any whole number. A host 104 communicates with a module 108 via a two wire interface 110A, 110B, . . . 110N. As shown, the optic modules are enclosed within a single enclosure 120 or housing.

As a drawback to prior art configurations, use of the same address by each module 108, prevents module specific addressing from a shared or common host 104. Because each module is assigned the same address, attempts to utilize a shared bus result in a shared host reading from or writing to every module, even though the intent was to write to single specific module. Controlled access to the memory, such as through the password method and apparatus described herein may occur in the system as shown in FIG. 2 or FIG. 3.

Although possible solutions to this drawback have been proposed, such solutions are viewed as undesirable. One such possible solution is to utilize a separate host for each module, such as shown in FIG. 1. As can be appreciated, this solution is not cost or space effective since a host must be associated with each module. Another solution is to have a technician physically disconnect a shared host from a first module to a second module to allow communication with the second module. Likewise, a technician may physically actuate an external switch that interconnects the various modules to the shared host. Although these options are possible options, it is clear that in reality these are not a desirable or economically options.

Figure 4:
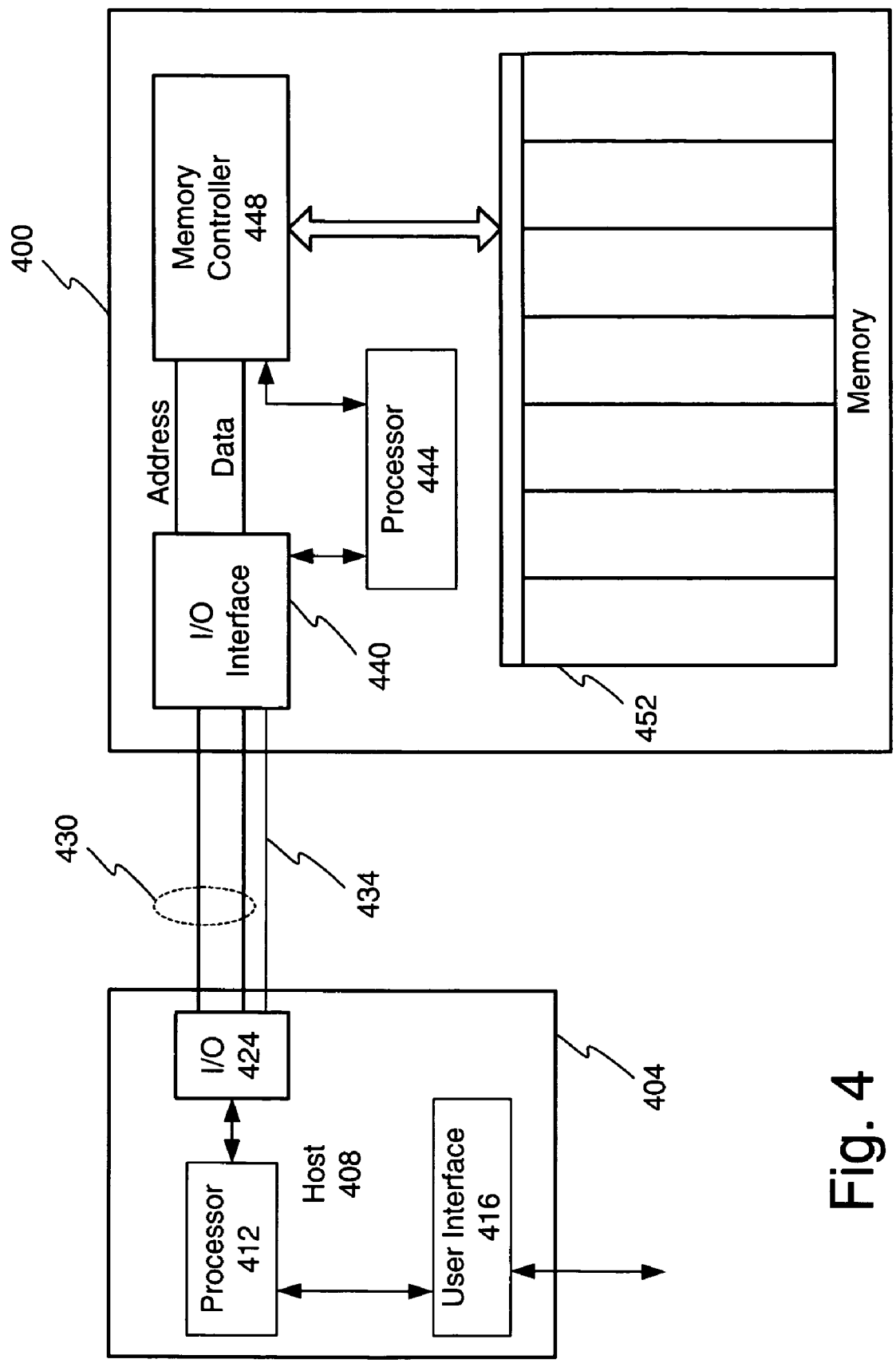
FIG. 4 illustrates an example embodiment of host to optic module control system.

FIG. 4 illustrates a block diagram of an example host with optic module. This is but one example embodiment of an optic module equipped for unique address conversion to establish unique module addressing. After reading the description provided herein, one of ordinary skill in the art may devise other systems or methods for establishing a unique address, without departing from the scope of the claims that follow. As shown in FIG. 4, a host 408 may comprise a user interface 416 which may interface with a user of the host, such as a technician or other machine to control the host, which in turn may control or interrogate or interact with the modules 400. The user interface 416 may comprise any element capable of receiving input and providing information regarding the host, module, or both. One example of a user interface is a keyboard, mouse, and display.

The user interface 416 may interact with a processor 412. The processor 412 may interact with an input/output (I/O) 424 which is configured to communicate with a module 400. As referenced in FIG. 2, the I/O may utilize a shared two wire interface path 430, which connects to other modules 400. This may be referenced as a shared path or a shared interface. Also connecting the host 408 and the module 400 is a control line 434, which in this example embodiment comprise a transmit disable line configured to conduct a transmit disable signal to the module 400. In other embodiments the control line may comprise a different path.

The two wire interface path 430 and the control line 434 connect to a module I/O interface 440 configured to achieve communication between the module 400 and the host 408. The interface 440 control and facilitate communication via paths 434, 430. Also part of the module 400 is a controller or processor 444, a memory controller 448, and one or more memory units 452. In this example embodiment, the interface 440 communicates with the memory controller 448 via an address line and a data line, as shown. The address line carries a particular memory address to the controller 448, while the data line carries data to the memory 452, via the controller 448. The interface 440 may also communicate with the processor 444.

The processor 444 may comprise any type processor, logic, control circuitry, or ASIC configured to perform as described herein. The processor 444 may control one or more aspects of the module 400 as would be understood. The processor 444 may be configured with internal memory (not shown) or utilized the memory 452 for storage of data, flag, or other information. The memory controller 448 may comprise any type control structure for writing information to or reading information from the memory 452. Operation of the module may occur as is understood by one of ordinary skill in the art.

For a module 400 to be standard compliant, the module is assigned a predetermined address. All standard compliant modules are assigned the same address. As can be appreciated, in the configuration of FIG. 2, attempting to communicate with a single particular module when all the modules share the same address, is simply not possible. Accordingly, the method and apparatus described herein, and discussed below in relation to FIG. 3 overcomes this drawback.

In one example method of operation, the host 408 connects to the module via the two wire interface path 430 and the transmit disable line 434. Operation of the module may not yet have commenced at this stage, although installation may have occurred. In another embodiment, operation may have commenced.

In one embodiment, the host 408 sends a signal via the transmit disable path 434 to the module 400 to cause the module to enter into a reconfiguration state. The module 400 is configured with logic, software, hardware, or a combination of these elements to interpret this incoming control signal to enable to module to have the modules address re-written.

For example, the housing may contain four modules 400, each of which have a transmit disable line 434 connected to the host. The modules 400 are configured with logic or other means to identify when a control signal is being sent to the modules. When a control signal is sent, such as when the transmit disable line goes high, the module 400 enters a write mode allowing the two line interface to re-write the address for the module with a unique address. The host 408 may sequentially force only one transmit disable line (control line) high at a time thereby allowing the host to sequentially re-write the addresses for each of the modules with unique addresses.

In one embodiment, the signal on the transmit disable line sets a bit or flag in the module to an alternate state which signifies to the modules that the address for the module is to be re-written. For example, the module may be configured such that a high state or setting the transmit disable flag may disable the I/O interface for the module. If only one module that connects to the host is left with an active I/O, such as an active interface 440, then as a result, the host may re-write the address of this module without re-writing the addresses of the other modules also connected to the host. This process of selectively de-activating all of the I/O interfaces 440, except one, and re-writing the address with a unique address may be repeated until each of the modules has a unique address. In one embodiment, the module is not yet active, during the module address re-write process, and hence, operation is not disrupted. In other modes of operation, the module may be active, i.e. transmitting and/or receiving optic signals during the address change operation.

In one embodiment, an initial write operation is performed to a default address using the two line interface path. This write operation to each module, which may occur over the shared two line interface path, forces each module to interpret the transmit disable signal as a chip select instead of a signal to disable operation of the module. This write operation may comprise setting a flag or a registering bit. When a module is configured in this manner, the transmit disable line becomes the module select thereby allowing the state (high/low) of transmit disable line, or a signal on the transmit disable line, to control if a module may receive communication from the host. By enabling only a single module at a time, and disabling the other modules, the address of each module may be changed to a unique address.

After the host re-writes the address of each modules to a unique address, a signal is sent from the host to each module restoring the transmit disable path to its original function, namely, disabling operation of the module. This may occur by the module being sent a signal that reverses the effect original signal that changed the configuration of the transmit disable line, and/or by re-writing a memory location or register to return the transmit disable line to its function as a transmit disable line, instead of a module select line. In one embodiment a configuration bit is set to control the function of the transmit disable line. In this embodiment the function of the transmit disable line is controlled by a control line status bit, which may be controlled by the host via the two line interface. The module may be configured with a status bit register or a location in memory, that may be modified by the host to control the function of the control line, such as a transmit disable line.

In one embodiment, the memory controller 448, the I/O interface, or any other element performs an address indirection or modification from the address specified via the two line interface path 430. As a result, the address specified by the host via the two line interface may be processed to generate a different address. This provides the benefit of a more flexible address scheme, as compared to the standard compliant devices, and may provide for a greater range of memory allocation and expansion. In one embodiment a look-up table is utilized to select or convert memory addresses. In one embodiment a FIFO memory allocation unit with address tracking is utilized to assign memory locations different than that those specified by the host. In one embodiment an address translation table is utilized.

As shown, the interface 440 may be configured to provide a device address and a data address. The device address may define a particular IC, a device within the module. The data address may define a memory location.

As discussed below in more detail, to selectively control access to the memory 452, the memory, memory controller 448, and processor 444 may accept a password from a user and compare the password to one or more access level passwords that are stored in the memory 452 or other memory. If a match is found, then the access to the memory range or addresses associated with that access level. Access may occur over a shared bus as shown in FIG. 2 or FIG. 3.

Figure 5:
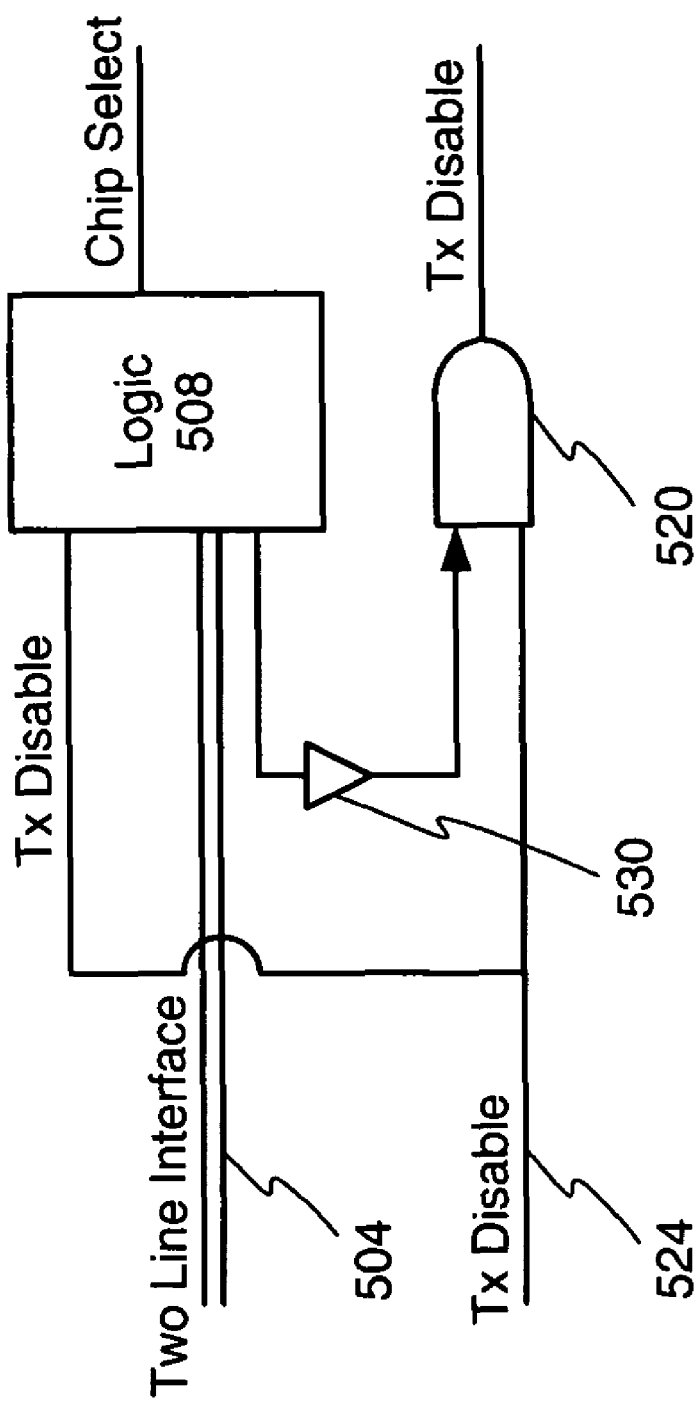
FIG. 5 illustrates an example embodiment of control system utilized to establish the control line as a module select.

FIG. 5 illustrates an example embodiment of control system utilized to establish the control line as a module select. This is but one possible example embodiment and as such, one of ordinary skill in the art may arrive at other configurations which do not depart from the scope of the claims. In this embodiment the two, line interface path 504 may connect to logic 508, which may optionally be equipped with memory. The signal on the two line interface path 504 may set a memory location or other logic element in the logic 508 to thereby generate an output to the logic element 520. In the embodiment of FIG. 5, element 520 comprises a AND gate and the input to the AND gate may be inverted to facilitate proper operation. In one embodiment as shown, the tx disable line 524 also connects to the logic 508 which, when combined with the signal on path 540, forces the logic 508 to output a signal to element 520. However, in other embodiments the tx disable line 524 may not connect to the logic 508 and, as a result, only the signals on path 504 cause the logic to establish the output from the logic to the logic element 520.

The element 520, upon receiving only the transmit disable signal, treats the transmit disable input a signal instructing the module to shutdown or be disabled. In contrast, when the signal on the transmit disable path 524 and the signal from the logic 508 are both high, then the signal on the transmit disable path operates as a module select. It is contemplated that the logic 508 and logic element 520 may comprise any type logic, processor, ASCI, controller or any combination thereof that is capable of functioning as described herein. The elements 508 and 520 may comprise hardware, software, or a combination of both. A logic element In an alternative configuration, the combination of a particular two line interface signal via path 504 in combination with the transit disable signal on path 524 causes the logic 508 to generate a module select signal thereby either disabling the module or enabling the module or the modules two line communication path or interface. By generating a module select signal with the logic 508, a single module, from multiple modules connected to a host, may be activated at a particular time, thereby allowing the host to selectively change the address of a particular active module.

Operation of the system of FIG. 5 is now discussed. During operation a particular signal may be sent to the logic 508 via path 504 to set the logic or a status bit. This signal changes operation of the control line, such as the tx disable line. This may occur, for all the modules, at the same time, to thereby disable the tx disable line of all modules from functioning as a module disable line. Instead a signal sent via the transmit disable path functions as a module select line. Accordingly, all of the modules may then be disabled, except for one, which may be enabled.

The host may then change the address of the enabled module via path 504 by re-writing the address location with the new address. This may occur for each module to establish a unique address for each module.

After the one or more addresses for the modules are changed, the two line interface path 504 may send a signal to the logic which restores operation of the tx disable path as a path for signals to disable the module, instead of serving as a module select line to facilitate module address changes.

In one embodiment, to initiate the address change process, a command from the host to all of the modules is sent via the two line path. At this stage all the modules receive the command because all modules have the same address. The command instructs all modules to set a status bit or register value to enter a state wherein a signal on the transmit disable path may disable or enable the two wire communication interface of the module.

Using the transmit disable path in this manner allows the host to select a particular module while disabling all others, to change the address of that particular module. This process may be repeated. After all modules have had their address changed, all the modules interfaces may be enabled and a command may be sent from host to the modules to restore operation of the transmit disable path to default mode.

Figure 6:
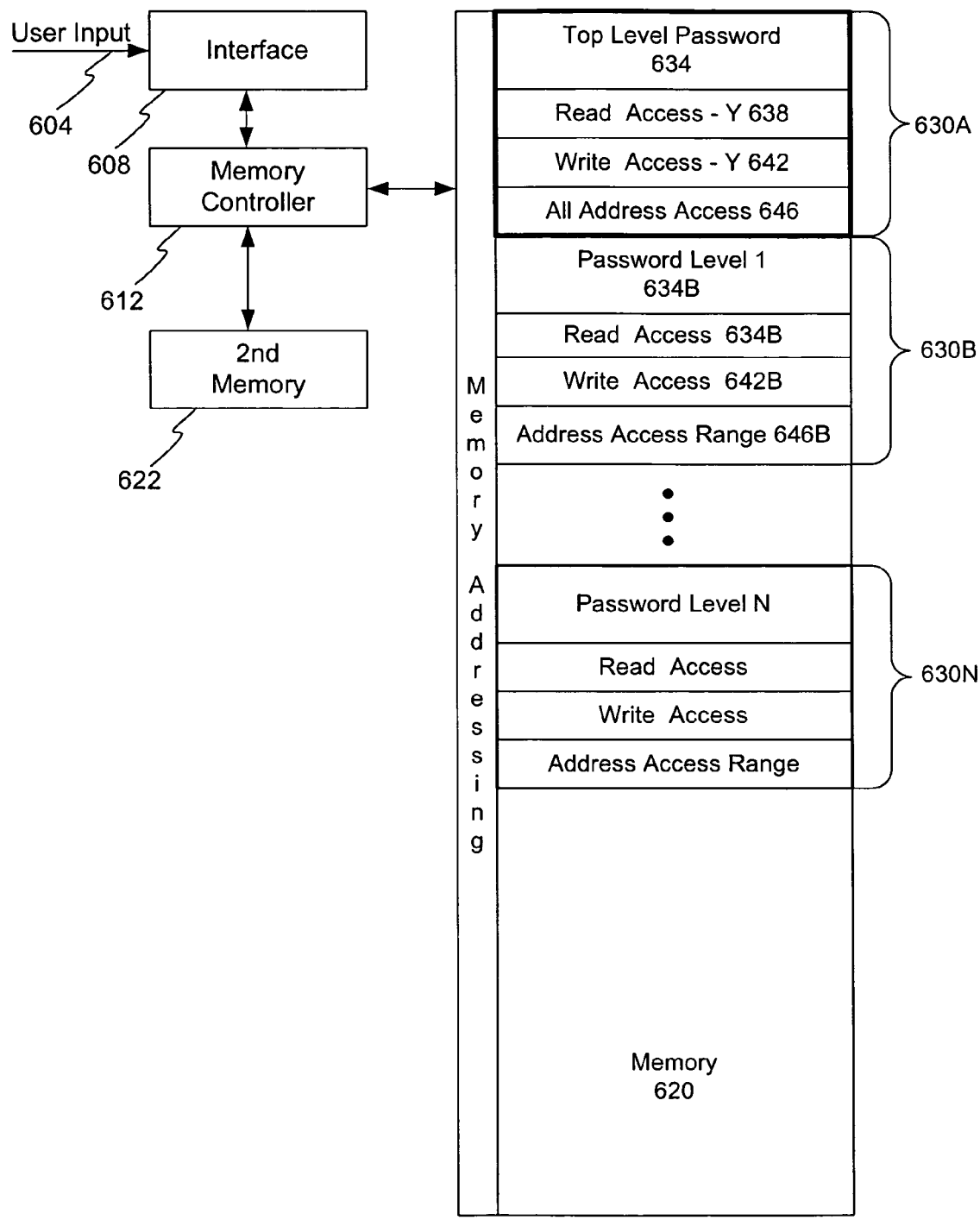
FIG. 6 illustrates an exemplary memory structure for multilevel password protection within an optic module.

FIG. 6 illustrates an exemplary memory structure for multilevel password protection within an optic module. This is but one possible embodiment of a multilevel password protection scheme for an optic module. In this embodiment a user input 604 is provided to an interface 608. The interface 608 is configured to provide access or allow for attempted access by a user or other device to the memory 620. It is contemplated that a user may physically enter a password, such as with a keyboard, or another electronic device may electronically enter the password. Interfaces 608, such as a user interface, are generally understood in the art and hence not described in detail.

The interface 608 connects to a memory controller 612, which in turn connects to the memory 620. The memory controller 612 may also connect to one or more additional memories 622. The memory controller 612, which may also be referred to as a memory interface, controls access to the memory and performs read/write control. In one embodiment, the memory controller 612 includes compare logic capable of comparing a password input by a user or other device via the interface 608 with one or more passwords stored in a memory, such as the memory 612. The memory controller 612 may also be configured with one or more registers or storage locations, such as the memory 620 or memory 622.

The memory 620 may comprise any type memory. Within the memory 620 are numerous memory locations which may be accessed via the interface 608. To provided controlled or password based access to the memory 620, one or more password level control blocks 630A-630N are provided in memory to store memory access control data. Any number of access levels A through N may be provided where N is any whole number.

With reference to access level 630A, which is stored it memory 620, it contains various data fields 634, 638, 642, 646 which define access for a user having top level access. The term top level access is defined to mean access to all or mostly all memory locations 620. Other levels of access, which may be defined in any manner, are discussed below. With regard to the top level access 630A, a password field 634, a read access field 638, write access field 642, and an address range field is provided. The password field 634 is configured to store a password which, if input correctly to the memory controller, will grant access to the address range shown in the address access range field 646. For example, in access level block 630A, which is the top level access, the user would have access to all memory locations because the values or data located in field 646 indicates access to all accessible memory locations.

Read access field 638 stores data, such as a bit or flag, that controls whether the user having the matching password of field 634 has capability to read from the memory locations set forth in the address access range field 646. Write access field 642 stores data, such as a bit or flag, that controls whether a user having or using the matching password of field 634 has capability to write from the memory locations set forth in the address access range field 646. Hence, selective read and write control may be provided to users depending on the password level to which they are granted. As access level block 630A is a top level access, it is contemplated that the user would have both read and write capability.

Field 646 comprises the address access range that corresponds to the password in field 634. The range of addresses to which a user having or entering the password may be defined as any range, or select group of memory locations, which need not be consecutive. In block 630A, which is the top level access, all memory addresses may be fully accessible.

Access level block 630B is generally similar to block 630A, but it is not a top level access, i.e. it may or may not grant full access to all memory locations within the memory. A unique level 1 password may be stored in field 634B. This password, if correctly supplied, grants a user access to the address range or address list in access range field 646B. The read access field and write access field 638B, 642B control the type of access granted by the password level 1. Namely, field 624B indicates whether read access is granted while field 642B grants whether write access is granted.

The memory 620 may contain any number of different access level blocks 630N to provide the desired level of memory control resolution as desired. In this manner, different users or individuals having access to the memory may be granted different levels or degrees of access to the memory which is controlled by the passwords. This controls access, to sensitive or private data and settings, to those with proper authority to view such information. The access to memory may overlap because each access range 642 is independent of the other access ranges.

It is further contemplated that each access level may have additional passwords and associated address access ranges. For example, a vendor may require access to the optic module, but the vendor may want different levels of access control. Hence, for a particular access level associated with that vendor, a first access level password may grant access to a first address range while a second password may grant access to a second address range. Hence, a vendor manager may receive access to all the vendor specific address ranges while a vendor technician may receive access only a limited subset of the addresses granted to the manager. It is thus contemplated that each access level may have multiple passwords each of which grant access to different or overlapping memory addresses. In one embodiment, the passwords are stair stepped to grant sequentially greater access. In this way, a first password will grant access to a first address group, a second password will grant access to a second address group, which provides greater access than the first address group. This stair step access may continue to any number of levels. In other embodiments, the access granted by each password may not overlap with other ranges.

Method of Operation

During operation, an optic module with password control is provided. To selectively control access to the memory locations, and hence the data stored therein, an access control scheme is provided as described herein. Prior to use, various levels of access are established using the user interface or other mean, such as prior to or after install, or during manufacture. In this embodiment a top access level in addition to level 1 through level N are established with passwords and stored in fields 634 through 634N for the various access levels. For each access level, address access will be established and stored in fields 646 through 646N.

After set up, a user attempting to access the memory of the optic module would provide a password via the user input 604 and the interface 608. The memory controller 612 may receive the password and perform a comparison to the passwords stored and located in the memory 620 in the memory locations 634-634N. Alternatively the access level data may be stored in memory 622. If the comparison returns a match between an access level password and the password input by the user, then user is granted access to the memory locations associated with that access level. For example, if the password typed in by the user matches the address located in level 1 634B, then the user would be granted access to the memory addresses stored in field 646B. Additional passwords may be entered to gain greater or different access to the data stored in the memory. A similar password comparison process would occur.

Read and write access would be controlled by the fields 638B and 642B. It is contemplated that an appropriate software and screen display interface may be provided to accept the password, and provide interaction between the system and the user. If the comparison does not result in a match, then the user is denied access to the memory.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for controlling write access to data stored in a first memory in an optic module, the method comprising:
   interfacing with the optic module via a host controller;
   providing a password entry to a memory controller, the memory controller controlling write access to memory which is separate from and shared by two or more elements in the optic module configured to transmit or received data over an optic fiber;
   reading one or more write access level passwords from the first memory or a second memory,
   comparing the password entry to the one or more write access level passwords;
   responsive to the comparing not locating a match between the password entry and an write access level password, denying write access to the data stored in the first memory; and
   responsive to the comparing locating a match between the password entry and an access level password, granting write access to only the data stored at memory addresses defined in an address write access range associated with the matched write access level password while excluding write access to data stored at other memory addresses, wherein the data controls one or more aspects of the optic module's transmit or receive operations and the address write access range does not include all memory addresses.

2. The method of claim 1, further comprising storing a second access level password in either the first memory, the second memory, or both and the second access level password grants access to a different address write access range.

3. The method of claim 1, wherein the address write access range defines to which memory locations write access is granted.

4. The method of claim 1, wherein the address write access range may define consecutive or non-consecutive memory locations.

5. The method of claim 1, further comprising analyzing a read only memory field to determine if read only capability is granted to the data stored at the memory write access range.

6. A memory access control system for controlling write access to data in memory in an optic transceiver module, the system comprising:
   a user interface configured to receive an entered password from a user;
   one or more optic transceiver modules connected to the user interface, an optic transceiver module comprising:
      a shared memory unit configured to store optic transceiver module data for two or more elements of the module and be separate from the two or more elements and one or more write access level data fields, wherein at least one of the one or more write access level data fields is configured to store at least one write access level password and an associated address range; and a comparator configured to compare the entered password to at least one of the at least one write access level passwords;

a controller, responsive to the comparison yielding a match between the entered password and at least one write access level password associated with an write access level, configured to grant write access to only the data stored in the address range associated with the matching write access level; and an optic transceiver configured to transmit and receive optic signals.

7. The system of claim 6, wherein the comparator comprises a controller or processor.

8. The system of claim 6, wherein the address range comprises a range of address which includes non-consecutive addresses.

9. The system of claim 6, wherein the access level data field further comprises a write capability field configured to store data that controls write capability for a password.

10. The system of claim 6, wherein the write access level data field further comprises a read capability field configured to store data that controls read capability for a password.

11. The system of claim 6, wherein at least one write access level password is stored in a first memory and the optic transceiver_ module data is stored in a second memory.

12. The system of claim 6, wherein at least one of the one or more write access level data fields further comprise a first password and an associated first address range and a second password and an associated second address range.

13. A memory access control system for controlling write access to control data in memory in an optic module, the system comprising:

a user interface configured to receive at least a first entered password and second entered password from one or more users;

a one or more separate memory units which are shared between elements of the optic module and configured to store optic module data for two or more elements of the optic module and one or more write access level data fields, wherein at least one of the one or more write access level data fields is configured to store at least a first stored password and a second stored password and an address group that is associated with the first stored password and an address group that is associated with the second stored password;

a controller configured to compare the first entered password to the stored first password and, responsive to a match between the first entered password and the first stored password, further configured to:

grant write access to only the address group associated with the first stored password, accept a second entered password;

compare the second entered password to the second stored password and responsive to a match between the second entered password and the second stored password, granting write access to only the address group associated with the second stored password;

a optic module configured to write control data to the one or more memory units and transmit an optic signal, the optic signal having one or more aspects controlled by the optic module control data stored in the one or more memory units.

14. The system of claim 13, wherein the address group associated with the first password comprise fewer memory addresses than the combination of the address group associated with the first password and the address group associated with the second stored password.

15. The system of claim 13, wherein write access to the address range associated with the second stored password includes the address groups associated with the first stored password.

16. The system of claim 13, further comprising a read field as part of the one or more access level data field, wherein data in the read field controls memory read capability.

17. The system of claim 13, wherein the controller comprises a processor configured to execute machine readable code.

18. The system of claim 13, further comprising a host configured to receive the first entered password from a user and communicate with more than one optic module via a shared bus wherein the optic module comprises an optic signal transmitter.

* * * * *